United States Patent
Gernat et al.

(10) Patent No.: US 12,378,507 B2
(45) Date of Patent: Aug. 5, 2025

(54) NON-ALCOHOLIC FERMENTED BEER HAVING IMPROVED FLAVOUR

(71) Applicant: HEINEKEN SUPPLY CHAIN B.V., Zoeterwoude (NL)

(72) Inventors: Deborah Casandra Gernat, Delft (NL); Eric Richard Brouwer, Zoeterwoude (NL); Marcel Ottens, Delft (NL)

(73) Assignee: HEINEKEN SUPPLY CHAIN B.V., Zoeterwoude (NL)

( * ) Notice: Subject to any disclaimer, the term of this patent is extended or adjusted under 35 U.S.C. 154(b) by 472 days.

(21) Appl. No.: 17/195,044

(22) Filed: Mar. 8, 2021

(65) Prior Publication Data

US 2021/0189306 A1 Jun. 24, 2021

Related U.S. Application Data

(63) Continuation of application No. PCT/NL2018/050585, filed on Sep. 10, 2018.

(51) Int. Cl.
| | | |
|---|---|---|
| C12C 12/04 | (2006.01) | |
| C12C 11/00 | (2006.01) | |
| C12C 12/00 | (2006.01) | |
| C12H 3/04 | (2019.01) | |

(52) U.S. Cl.
CPC ............ C12C 12/04 (2013.01); C12C 11/003 (2013.01); C12C 12/006 (2013.01); C12H 3/04 (2019.02)

(58) Field of Classification Search
CPC ........... C12C 23/04; C12C 12/04; C12H 3/04; C12H 12/04
See application file for complete search history.

(56) References Cited

U.S. PATENT DOCUMENTS

| | | |
|---|---|---|
| 5,308,631 A | 5/1994 | Anglerot |
| 6,162,360 A | 12/2000 | Ho et al. |
| 6,596,909 B2 | 7/2003 | Nishijima et al. |
| 2012/0207909 A1 | 8/2012 | Itakura et al. |
| 2013/0280399 A1 | 10/2013 | Murakami et al. |
| 2016/0319230 A1 | 11/2016 | Kawashima et al. |

FOREIGN PATENT DOCUMENTS

| | | | |
|---|---|---|---|
| EP | 0 101 254 A2 | 2/1984 | |
| EP | 3 088 507 A1 | 11/2016 | |
| JP | 2017-023124 A1 | 2/2017 | |
| WO | WO-03/068905 A | 8/2003 | |
| WO | WO-2013030398 A1 * | 3/2013 | ........... C12C 11/003 |
| WO | WO-2014/141544 A1 | 9/2014 | |
| WO | WO-2014/135673 A2 * | 9/2014 | ........... C12C 12/006 |
| WO | WO-2014/161998 A1 | 10/2014 | |
| WO | WO-2018213154 A1 * | 11/2018 | ......... A23C 19/0925 |

OTHER PUBLICATIONS

Yamada et al. (JP 2015209198—Translated Description) (Year: 2015).*
Yamada et al. (JP 2015209198—Translated Claims ) (Year: 2015).*
Lewis et al. ("Brewing, Second Edition: Chapter 1 Overview of the brewing process", Michael J. Lewis and Tom W. Young, Springer Science + Business, 2001, pp. 3-10 (Year: 2001).*
Piornos et al., "Alcohol-free and low-alcohol free beers: Aroma chemistry and sensory characteristics", Compr Rev Food Sci Food Saf., 22, (2022), pp. 233-259). (Year: 2022).*
International Search Report and Written Opinion mailed May 8, 2019 in International Application No. PCT/NL2018/050585, 10 pages.

* cited by examiner

*Primary Examiner* — Elizabeth Gwartney
(74) *Attorney, Agent, or Firm* — Foley & Lardner LLP

(57) ABSTRACT

The invention provides a process of producing a non-alcoholic beer comprising the steps of:
fermenting the wort with live yeast to produce a fermented wort;
subjecting the fermented wort to one or more further process steps to produce a non-alcoholic beer; and
introducing the non-alcoholic beer in a sealed container;
wherein either the fermentation produces a non-alcoholic fermented wort or wherein the fermentation produces an alcoholic fermented wort and alcohol is subsequently removed to produce a non-alcoholic fermented wort or a non-alcoholic beer; and
wherein the heated wort, the non-alcoholic fermented wort and/or the non-alcoholic beer is contacted with a hydrophobic silicate-based molecular sieve.
Flavour substances contributing to undesirable flavour notes in non-alcoholic beer can be removed effectively during production by contacting wort before or after fermentation with a hydrophobic silicate-based molecular sieve, provided the wort contains virtually no alcohol.

10 Claims, No Drawings

NON-ALCOHOLIC FERMENTED BEER HAVING IMPROVED FLAVOUR

CROSS-REFERENCE TO RELATED APPLICATIONS

The present application is a continuation of International Patent Application No. PCT/NL2018/050585 filed Sep. 10, 2018, the entire contents of which are hereby incorporated by reference.

TECHNICAL FIELD OF THE INVENTION

The present invention relates to the production of non-alcoholic fermented beer having improved flavour. More particularly, the present invention provides a process of producing a non-alcoholic fermented beer in which so called 'worty' flavour notes are reduced by treatment with a hydrophobic silicate-based molecular sieve, such as a hydrophobic zeolite.

The invention also relates a non-alcoholic fermented beer having a unique agreeable flavour profile without undesirable worty flavour notes.

BACKGROUND OF THE INVENTION

Beer is a universally popular beverage, consumed worldwide. Beer is commonly produced by a process that comprises the following basic steps:
  mashing a mixture of grain and water to produce a mash;
  separating the mash in wort and spent grain;
  boiling the wort to produce a boiled wort;
  fermenting the boiled wort with live yeast to produce a fermented wort;
  subjecting the fermented wort to one or more further process steps (e.g. maturation and filtration) to produce beer; and
  packaging the beer in a sealed container, e.g. a bottle, can or keg.

In recent years, the beer market has witnessed a significant increase in the consumption of non-alcoholic beer. This increase is triggered by concerns about health and safety, and is expedited by innovations that have substantially improved the quality of non-alcoholic beers.

Non-alcoholic beers are produced by two basis processes. One applies classical brewing processes followed by alcohol removal by techniques such as reverse osmosis, dialysis or evaporation. The other approach aims at reducing the formation of alcohol during fermentation by contacting boiled wort with live yeast under conditions that minimise fermentative production of alcohol. This type of process is commonly referred to as "restricted alcohol fermentation".

Non-alcoholic beers typically have an off-flavour note that is commonly referred to as 'worty'. This worty flavour note has been attributed to aldehydes that are formed during wort boiling, notably methional (3-methylthiopropionaldehyde), 3-Methylbutanal, 2-methylbutanal, 2-methypropanal and phenylacetaldehyde.

Methional is formed by the interaction of α-dicarbonyl compounds (intermediate products in the Maillard reaction) with methionine through the Strecker degradation reaction. Similarly, 3-methylbutanal, 2-methylbutanal and 2-methyl propanal are formed by the interactions of α-dicarbonyl compounds with leucine, isoleucine and valine respectively.

Furfural is another flavour compound that is formed during wort boiling and that can adversely affect the flavour of non-alcoholic beers. Furfural is produced by heat induced caramelisation reactions.

In non-alcoholic beer the contribution of the aforementioned worty flavour substances and furfural to the overall flavour of the beer is unduly prominent. This is partly due the fact that the concentrations of these flavour substances in non-alcoholic beers are higher than in ordinary beers, especially in non-alcoholic beers that have been produced by restricted alcohol fermentation. In addition, the absence of alcohol in non-alcoholic beers increases the intensity with which these flavour substances are perceived by consumers.

Attempts have been made to reduce the worty flavour aspect of non-alcoholic beers.

US 2013/0280399 describes a method for producing an alcohol-free beer-like malt beverage comprising reducing the off-flavor originated from wort by adding terpene, e.g. terpinolene.

US 2012/0207909 describes a method for producing an unfermented beer-flavored malt beverage, comprising contacting a wort with activated carbon to reduce an unpleasant wort flavour.

Use of zeolites in the production of beer has been described in the prior art.

U.S. Pat. No. 5,308,631 describes a process for obtaining alcohol-free beer from a naturally alcoholic beer, consisting of:
  (a) bringing into contact an alcoholic beer with a solid adsorbent consisting of a hydrophobic zeolite to form an aqueous eluent phase and products adsorbed on said adsorbent;
  (b) separating the aqueous eluent phase from the adsorbent;
  (c) thermally desorbing said adsorbed products to form a desorbed phase;
  (d) recovering the desorbed phase;
  (e) separating the desorbed phase into an alcoholic phase and an aromatic aqueous phase; and
  (f) reconstituting an alcohol-free beer by mixing the aqueous phases recovered at the end of (b) and (e).

WO 03/068905 describes a method for reducing the amount of haze in beer, the method including the step of filtering the beverage through a bed of ground zeolite, wherein the zeolite is selected from the list comprising of Zeolite-A, Zeolite-X and Zeolite-Y.

US 2016/0319230 describes a method for producing an alcoholic beverage, comprising purifying the alcoholic beverage by removing unwanted sulfur compounds contained in the alcoholic beverage through a metal-supported zeolite, wherein the metal-supported zeolite comprises a zeolite which is at least one selected from a beta-type one and a Y-type one, and silver supported on the zeolite. The examples describe the removal of the following sulfur compounds: dimethyl sulfide, dimethyl disulfide and dimethyl trisulfide.

Zeolite™ 63 (ex Murphy & Son Ltd.), a blend of naturally occurring volcanic material (crystalline aluminosilicate mineral with approximated empirical formula: $(Ca, Fe, K, Mg, Na)_{3-6}Si_{30}Al_6O_{72} \cdot 24H_2O$) and copper salts, is said to reduce sulphidic off flavours ($H_2S$ and dimethyl sulphide) in fermented beverages. This product is to be dosed to beer at the end of fermentation or at the start of cold maturation.

The use of hydrophobic zeolite to adsorb aldehyde is described in U.S. Pat. No. 6,596,909. This US patent describes a ZSM-5 zeolite having $NH_4^+$ as ionic species and having a molar ratio of $SiO_2/Al_2O_3$ of 30 to 190. This zeolite was used to adsorb acetaldehyde and formaldehyde from a gas stream.

SUMMARY OF THE INVENTION

The inventors have discovered that flavour substances contributing to undesirable flavour notes in non-alcoholic beer can be removed effectively during production by contacting wort before or after fermentation with a hydrophobic silicate-based molecular sieve, provided the wort contains virtually no alcohol. Accordingly, the present invention provides a process of producing a non-alcoholic beer having an alcohol content of less than 1.0% alcohol by volume (ABV), said method comprising the steps of:

mashing a mixture of grain and water to produce a mash;
separating the mash in wort and spent grain;
heating the wort for at least 10 minutes to temperature of at least 80° C. to produce a heated wort;
fermenting the heated wort with live yeast to produce a fermented wort;
subjecting the fermented wort to one or more further process steps to produce a non-alcoholic beer; and
introducing the non-alcoholic beer in a sealed container;
wherein either the fermentation produces a non-alcoholic fermented wort or wherein the fermentation produces an alcoholic fermented wort and alcohol is subsequently removed to produce a non-alcoholic fermented wort or a non-alcoholic beer; and
wherein the heated wort, the non-alcoholic fermented wort and/or the non-alcoholic beer is contacted with a hydrophobic silicate-based molecular sieve containing $SiO_2$ and $Al_2O_3$ in a molar ratio of at least 15.

It was surprisingly found that the hydrophobic silicate-based molecular sieve is capable of effectively removing worty flavour substances without removing significant quantities of other important beer flavour substances. Thus, the present process enables selective removal of worty flavour substances, e.g. methional, without significant effect on the rest of the beer flavour profile.

The present invention further pertains to a non-alcoholic fermented beer having an alcohol content of less than 1.0% ABV, said beer containing methional, 2-methyl butanal, 3-methyl butanal, 2-methyl propanal, phenyl acetaldehyde and furfural and maltotriose in concentrations that meet the following conditions:

$$[Maltotriose] \geq 5.0$$

$$X = \frac{([Meth])}{9} + \frac{([2MB])}{5} + \frac{([3MB])}{14} + \frac{([2MP])}{8} + \frac{([PA])}{9} + \frac{([FF])}{100} \frac{X}{[Maltotriose]} \leq 0.4$$

wherein
[Meth] represents the methional concentration in µg/L;
[2 MB] represents the 2-methyl butanal concentration in µg/L;
[3 MB] represents the 3-methyl butanal concentration in µg/L;
[2MP] represents the 2-methyl propanal concentration in µg/L;
[2PA] represents the phenyl acetaldehyde concentration in µg/L;
[FF] represents the furfural concentration in µg/L;
[Maltotriose] represents the maltotriose concentration in g/L.

Non-alcoholic beers having a maltotriose concentration of at least 5 g/L have typically been produced by restricted alcohol fermentation.

DETAILED DESCRIPTION OF THE INVENTION

A first aspect of the invention relates to a process of producing a non-alcoholic fermented beer having an alcohol content of less than 1.0% ABV, said method comprising the steps of:

mashing a mixture of grain and water to produce a mash;
separating the mash in wort and spent grain;
heating the wort for at least 10 minutes to temperature of at least 80° C. to produce a heated wort;
fermenting the heated wort with live yeast to produce a fermented wort;
subjecting the fermented wort to one or more further process steps to produce a non-alcoholic beer; and
introducing the non-alcoholic beer in a sealed container;
wherein either the fermentation produces a non-alcoholic fermented wort or wherein the fermentation produces an alcoholic fermented wort and alcohol is subsequently removed to produce a non-alcoholic fermented wort or a non-alcoholic beer; and wherein the heated wort, the non-alcoholic fermented wort and/or the non-alcoholic beer is contacted with a hydrophobic silicate-based molecular sieve containing $SiO_2$ and $Al_2O_3$ in a molar ratio ($SiO_2:Al_2O_3$) of at least 15.

The term "alcohol" as used herein is synonymous with "ethanol".

The term "non-alcoholic" as used herein, unless indicated otherwise, means that the alcohol content is less than 1.0% alcohol by volume (ABV).

The term "alcoholic" as used herein, unless indicated otherwise, means that the alcohol content exceeds 1.0% alcohol by volume (ABV).

The term "mashing" as used herein refers to the admixing of starch-containing grain, water and enzymes capable of hydrolysing starch. The latter enzymes may be provided by e.g. malt or by another enzyme source, e.g. a commercially available enzyme preparation containing starch degrading enzymes such as those found in malt, notably α-amylase, β-amylase and/or glucoamylase. Preferably, the enzymes are employed in the present method in the form of malt. During the mashing, starch is hydrolysed and fermentable sugars are formed.

The term "fermenting" as used herein refers to the contacting of heated wort with live yeast during a period of at least 1 hour.

The term "restricted alcohol fermentation" as used herein refers to the fermentation of heated wort that yields a non-alcoholic fermented wort. This is achieved by applying fermentation conditions that minimise fermentative production of alcohol. This can be done in different ways, e.g.:

by employing short fermentation times, optionally combined with low fermentation temperatures (e.g. 'Cold Contact Process'); and/or
by using a yeast strain that does not produce alcohol in appreciable amounts, e.g. because they are unable to produce alcohol dehydrogenase (ADH) and/or because they are unable to ferment maltose; and/or
by employing a combination of yeast strains, including a yeast strain that consumes ethanol (e.g. *Saccharomyces rouxii*); and/or
by reducing the concentration of fermentable sugars in the heated wort;

The term "Cold Contact Process" as used herein refers to the fermentation of heated wort by contacting the heated wort with live yeast at a temperature of not more than 4° C. for at least 1 day.

The term "molecular sieve" as used herein refers to a microporous material having pores with a diameter of not more than 2 nm.

The term "silicate based" means that the material contains at least 67 wt. % silicate.

The term "zeolite" as used herein refers to a microporous aluminosilicate. The zeolites employed in accordance with the invention can be naturally occurring zeolites or synthetic zeolites.

It should be understood that hydrophobic silicate-based molecular sieves that contain $SiO_2$ and no $Al_2O_3$ meet the condition that the molecular sieve contains $SiO_2$ and $Al_2O_3$ the molar ratio of at least 15.

Separation of the mash in wort and spent grain can be done in ways well-known in the brewing art, e.g. by lautering.

The heating of the wort serves several purposes, including enzyme inactivation, protein precipitation, conversion of alpha acids from hop into iso-alpha acids and dissipation of volatile flavour substances, such as dimethyl sulphide and aldehydes. To achieve this the wort is typically heated to a temperature of at least 90° C., more preferably at least 95° C. and most preferably to boiling temperature for at least 10 minutes. More preferably, the wort is heated to the aforementioned temperature for at least 30 minutes, most preferably for 60-300 minutes.

The present process preferably comprises the addition of hops and/or hop extract. Hops and hop extract are preferably added to the wort before or during the heating.

Prior to fermentation of the heated wort, trub may be removed from the heated wort in a wort clarifier, such as a whirlpool.

The heated wort, the non-alcoholic fermented wort or the non-alcoholic beer that is contacted with the hydrophobic silicate-based molecular sieve (hydrophobic molecular sieve) in the present process preferably contains at least 1 μg/L methional, and/or at least 1 μg/L 2-methyl butanal and/or at least 2 μg/L 3-methyl butanal and/or at least 1 μg/L 2-methylpropanal and/or at least 4 μg/L phenyl acetaldehyde. More preferably, before the contacting, the heated wort, the non-alcoholic fermented wort or the non-alcoholic beer contains at least 3 μg/L methional, and/or at least 3 μg/L 2-methyl butanal and/or at least 6 μg/L 3-methyl butanal and/or at least 3 μg/L 2-methylpropanal and/or at least 12 μg/L phenyl acetaldehyde.

According to a particularly preferred embodiment, prior to the contacting with the hydrophobic molecular sieve, the heated wort, the non-alcoholic fermented wort or the non-alcoholic beer contains at least 2 μg/L methional and at least 2 μg/L 2-methyl butanal and at least 4 μg/L 3-methyl butanal.

The contacting of the heated wort, the non-alcoholic fermented wort or the non-alcoholic beer with the hydrophobic molecular sieve can be done in several ways. Particles of the hydrophobic molecular sieve may be mixed with the wort or beer so as to allow adsorption of the worty flavour substances, followed by a solid-liquid separation to recover the particles containing the adsorbed worty flavour substances and the treated wort or beer. Solid-liquid separation techniques that can be used include filtration, centrifugation and decanting.

The contacting of the wort or beer can also be achieved by passing the wort or beer across a bed comprising particles of the hydrophobic molecular sieve or by passing the wort or beer through a monolith that comprises the hydrophobic molecular sieve. This particular embodiment offers the important advantage that it does not require a separation step and that it is relatively easy to recover the adsorbed flavour substances by desorption, using a suitable eluent.

In a preferred embodiment, the hydrophobic molecular sieve contains at least 80 wt. % of metallo-silicate. More preferably, the hydrophobic molecular sieve contains at least 85 wt. %, especially at least 90 wt. % of metallo-silicate selected from aluminosilicate, titanium silicate, ferrosilicate, borosilicate and combinations thereof. According to a particularly preferred embodiment, the hydrophobic molecular sieve contains at least 50 wt. %, especially at least 80 wt. % of aluminosilicate. Most preferably, the hydrophobic molecular sieve is an aluminosilicate.

The hydrophobic molecular sieve of the present invention preferably comprises one or more silicates selected from hydrophobic zeolites, hydrophobic clays and glass. More preferably, the hydrophobic molecular sieve comprises crystalline silicate.

According to a particularly preferred embodiment, the hydrophobic molecular sieve is hydrophobic zeolite.

The hydrophobic zeolite that is employed in the present process preferably has a molar $SiO_2/Al_2O_3$ ratio of at least 40, more preferably of at least 100, even more preferably of at least 200, most preferably of at least 250.

The hydrophobic silicate-based molecular sieve typically contains $SiO_2$ and metal oxide in a molar ratio of at least 40, more preferably of at least 100 even more preferably of at least 200 and most preferably of at least 250.

The hydrophobic zeolite preferably is selected from ZMS-5 zeolite, zeolite type Y, zeolite-beta, silicalite, all-silica ferrierite, mordenite and combinations thereof. More preferably, the hydrophic zeolite is selected from ZMS-5 zeolite, zeolite type Y, zeolite-beta and combinations thereof. Most preferably, the hydrophobic zeolite is ZMS-5 zeolite.

The pore size diameter of the hydrophobic molecular sieve preferably is in the range of 0.2-1.2 nanometer, more preferably 0.3-1.0 nanometer, even more preferably of 0.4-0.8 nanometer and most preferably of 0.45-0.70 nanometer. The pore size diameter of the hydrophobic molecular sieve can be determined by analysing the nitrogen adsorption isotherms at 77 K with the t-plot-De Boer method.

As explained herein before, the hydrophobic molecular sieve may be employed in the present process in the form of particles or in the form of a monolith. Preferably, the hydrophobic molecular sieve is applied in the form of particles. The particulate hydrophobic molecular sieve preferably has a mass weighted average particle size in the range of 1 to 2000 micrometer, more preferably in the range of 10 to 800 micrometer and most preferably of 100 to 300 micrometer. The particle size distribution of the particulate hydrophobic molecular sieve can be determined using a set of sieves of different mesh sizes.

The surface area of the hydrophobic molecular sieve preferably is at least 100 $m^2/g$, more preferably 150 to 2,000 $m^2/g$ and most preferably 200 to 1,000 $m^2/g$. The surface area of the hydrophobic molecular sieve can be determined by the BET method.

In accordance with a preferred embodiment of the present process, the contacting with the hydrophobic molecular sieve removes at least 75%, more preferably at least 80% and most preferably at least 90% of the 2-methyl butanal and/or of the 3-methyl butanal that is contained in the heated wort, the non-alcoholic fermented wort or the non-alcoholic beer.

In the present process, the heated wort, the non-alcoholic fermented wort and/or the non-alcoholic beer is contacted with the hydrophobic molecular sieve for at least 10 seconds, more preferably for at least 20 seconds and most preferably for 30 seconds. Here the term "contact time" refers to the time that the wort or beer is in direct contact with the hydrophobic molecular sieve. If the non-alcoholic fermented wort or beer is contacted with the hydrophobic molecular sieve by passing it through a bed of hydrophobic molecular sieve, contact time (i.e. the time needed for a fraction of the beer or wort to pass through the bed) can be very short. However, if the hydrophobic molecular sieve is added to a batch of non-alcoholic fermented wort or non-alcoholic beer, a suitable contact time may easily may exceed 10 minutes. Typically the contact time does not exceed 4 hours.

The heated wort, the non-alcoholic fermented wort and/or the non-alcoholic beer typically has a temperature in the range of 0-95° C., more preferably in the range of 2-20° C. when it is contacted with the hydrophobic molecular sieve.

According to another preferred embodiment, the contacting with the hydrophobic molecular sieve removes at least 70%, more preferably at least 80% and most preferably at least 85% of methional contained in the heated wort, the non-alcoholic fermented wort or the non-alcoholic beer.

In accordance with the present invention, the hydrophobic molecular sieve can be applied to the heated wort before fermentation, or it can be applied after fermentation, provided the fermented wort or the beer is non-alcoholic.

According to one embodiment, the hydrophobic molecular sieve is applied before fermentation, i.e. the heated wort is contacted with the hydrophobic molecular sieve. This embodiment offers the advantage that removal of desirable flavour substances that are formed during fermentation is avoided.

According to another embodiment, the hydrophobic molecular sieve is applied after fermentation. Preferably, the fermented wort is filtered to remove yeast, followed by the contacting of the wort or beer with the hydrophobic molecular sieve.

According to a particularly preferred embodiment, the present process employs a fermentation step that produces a non-alcoholic fermented wort, e.g. by employing restricted alcohol fermentation. This is preferably achieved by employing a yeast strain that produces little or no alcohol and/or by carrying out fermentation under conditions that minimise alcohol production by the yeast. According to a particularly preferred embodiment, the fermentation is carried out under conditions that minimise alcohol production to produce a non-alcoholic fermented wort. A preferred embodiment of such a fermentation process is the Cold Contact Process. Preferably, the present process comprises fermenting the heated wort with live yeast at a temperature of less than 4° C., more preferably of less than 2° C. for at least 1 day, more preferably for at least 2 days. In the Cold Contact Process the worty flavour substances are metabolised by the yeast, but only to a limited extent. Thus, even though fermentation reduces the worty flavour notes, non-alcoholic beers produced by the Cold Contact Process have clearly perceptible worty flavour notes.

In the Cold Contact Process not more than a limited fraction of the fermentable sugars are metabolised. Consequently, the fermented wort obtained by the Cold Contact process typically has a maltotriose content of at least 5.0 g/L.

The present process is particularly advantageous if the wort or beer that is treated with the hydrophobic molecular sieve has a high content of the following flavour substances: methional, 2-methyl butanal, 3-methyl butanal, 2-methyl propanal, phenyl acetaldehyde and furfural. Preferably, said wort or beer meets the following condition:

$$\frac{([Meth])}{9} + \frac{([2MB])}{5} + \frac{([3MB])}{14} + \frac{([2MP])}{8} + \frac{([PA])}{9} + \frac{([FF])}{100} \geq 6.0$$

wherein

[Meth] represents the methional concentration in µg/L;
[2 MB] represents the 2-methyl butanal concentration in µg/L;
[3 MB] represents the 3-methyl butanal concentration in µg/L;
[2MP] represents the 2-methyl propanal concentration in µg/L;
[2PA] represents the phenyl acetaldehyde concentration in µg/L;
[FF] represents the furfural concentration in µg/L.

In the present process the fermented wort is suitably subjected to one or more further process steps to produce a non-alcoholic beer. Further process steps that may be employed include maturation and filtration.

At the end of the present process the non-alcoholic beer is introduced into a sealed container. Examples of suitable containers include bottles, cans, kegs and tanks.

The present process preferably yields a non-alcoholic fermented beer having an alcohol content of less than 0.5% ABV.

The non-alcoholic beer that is produced by the present process preferably is a pale coloured beer that measures 4-15, preferably 5-11 EBC units. Here EBC stands for "European Brewery Convention". The EBC method is quantitative and involves measuring the beer sample colour in a cuvette that is placed in a spectrophotometer at a wavelength of 430 nm.

The actual formula for measuring color is $EBC = 25 \times D \times A_{430}$, where $D$ = dilution factor of the sample
$A_{430}$ = the light absorbance at 430 nanometers in a 1-cm cuvette.

The beer produced by the present process preferably is a lager.

Another aspect of the present invention relates to a non-alcoholic fermented beer having an alcohol content of less than 1.0% ABV, more preferably of less than 0.5% ABV, said beer containing beer containing methional, 2-methyl butanal, 3-methyl butanal, 2-methyl propanal, phenyl acetaldehyde and furfural and maltotriose in concentrations that meet the following conditions:

[Maltotriose]5.0

$$X = \frac{([Meth])}{9} + \frac{([2MB])}{5} + \frac{([3MB])}{14} + \frac{([2MP])}{8} + \frac{([PA])}{9} + \frac{([FF])}{100} \; \frac{X}{[Maltotriose]} \leq 0.4$$

wherein

[Meth] represents the methional concentration in µg/L;
[2 MB] represents the 2-methyl butanal concentration in µg/L;
[3 MB] represents the 3-methyl butanal concentration in µg/L;
[2MP] represents the 2-methyl propanal concentration in µg/L;
[2PA] represents the phenyl acetaldehyde concentration in µg/L;
[FF] represents the furfural concentration in µg/L;
[Maltotriose] represents the maltotriose concentration in g/L.

More preferably, the aforementioned ratio does not exceed 0.35, most preferably the ratio is in the range of 0.03 to 0.30.

In accordance with a particularly preferred embodiment, non-alcoholic fermented beer contains the flavour substances methional, 2-methyl butanal, 3-methyl butanal, 2-methyl propanal, phenyl acetaldehyde and furfural in concentrations that meet the following condition:

$$\frac{([Meth])}{9} + \frac{([2MB])}{5} + \frac{([3MB])}{14} + \frac{([2MP])}{8} + \frac{([PA])}{9} + \frac{([FF])}{100} \geq 6.0$$

According to a more preferred embodiment, the concentrations of the flavour substances meet the following condition:

$$\frac{([Meth])}{9} + \frac{([2MB])}{5} + \frac{([3MB])}{14} + \frac{([2MP])}{8} + \frac{([PA])}{9} + \frac{([FF])}{100} \leq 6.0.$$

Most preferably, these concentrations meet the following condition:

$$\frac{([Meth])}{9} + \frac{([2MB])}{5} + \frac{([3MB])}{14} + \frac{([2MP])}{8} + \frac{([PA])}{9} + \frac{([FF])}{100} \leq 2.5.$$

According to a particularly preferred embodiment, the non-alcoholic fermented beer according to the present invention has been produced by a process that employs restricted alcohol fermentation. The Cold Contact Process is a suitable example of such a restricted alcohol fermentation. Restricted alcohol fermentation is characterised by limited metabolisation of fermentable sugars during fermentation. Accordingly, the non-alcoholic fermented beer of the present invention preferably contains at least 6 g/L, more preferably at least 7 g/L, even more preferably at least 7.5 g/L maltotriose and most preferably 8-20 g/L maltotriose.

The non-alcoholic beer of the present invention typically contains methional in a concentration of less than 20 µg/L, more preferably in a concentration of less than 10 µg/L and most preferably in a concentration of 0.4-5 µg/L.

The non-alcoholic beer typically contains 2-methyl butanal in a concentration of less than 8 µg/L, more preferably in a concentration of less than 6 µg/L and most preferably in a concentration of 0.3-4 µg/L.

The non-alcoholic beer typically contains 3-methyl butanal in a concentration of less than 25 µg/L, more preferably in a concentration of less than 15 µg/L and most preferably in a concentration of 1-10 µg/L.

The non-alcoholic beer typically contains phenyl acetaldehyde in a concentration of less than 20 µg/L, more preferably in a concentration of less than 12 µg/L and most preferably in a concentration of 1-9 µg/L.

The furfural content of the non-alcoholic beer typically is less than 50 µg/L, more preferably less than 20 µg/L and most preferably in the range of 0.2-10 µg/L.

The non-alcoholic beer according to the present invention typically contains methionine in a concentration of at least 2 mg/L methionine, more preferably of at least 3 mg/L and most preferably of 5-15 mg/L.

In a preferred embodiment, the non-alcoholic beer contains methional in a concentration of less than 20 µg/L and 2-methyl butanal in a concentration of less than 8 µg/L and 3-methyl butanal in a concentration of less than 25 µg/L and 2-methyl propanal in a concentration of less than 15 µg/L and phenyl acetaldehyde in a concentration of less than 20 µg/L.

According to another preferred embodiment, the non-alcoholic beer contains methional and methionine in a weight ratio of less than 0.8 (µg/mg), more preferably of less than 0.5 (µg/mg) and most preferably of less than 0.3 (µg/mg).

The treatment with the hydrophobic molecular sieve has not more than a marginal impact on the concentration of iso-alpha acids as these acids are unable to enter the pores of the molecular sieve. In this respect molecular sieves behave differently from other hydrophobic adsorbents such as activated carbon. Typically, the non-alcoholic beer contains at least 1.0 mg/L iso-alpha acids, more preferably at least 1.5 mg/L and most preferably 2.0-80 mg/L of iso-alpha acids, said iso-alpha acids being selected from isohumulone, isoadhumulone, isocohumulone, reduced versions of these iso-alpha acids and combinations thereof. Reduced version of iso-alpha acids are tetrahydroiso-alpha-acids and hexahydroiso-alpha-acids.

As explained herein before, the non-alcoholic beer of the present invention preferably is a pale beer measuring 4-15, more preferably 5-11 EBC units.

According to a particularly preferred embodiment, the non-alcoholic beer is a non-alcoholic lager.

The beer of the present invention is preferably obtained by a process as described herein before.

The invention is illustrated by means of the following non-limiting examples.

EXAMPLES

Example 1

The ability to selectively absorb methional, 2-methyl butanal and 3-methyl butanal was investigated for a number of commercially available silicate-based molecular sieves (8 zeolites and a titanium silicate). The characteristics of these molecular sieves are shown in Table 1.

TABLE 1

| Name | Supplier | Type | Molar ratio $SiO_2/Al_2O_3$ | Pore Size [nm] | Surface area [m2/g] |
|---|---|---|---|---|---|
| HiSiv3000 | UOP | ZSM-5 | >1000 | 0.6 | >400 |
| ZSM-5 P-360 | ACS materials | ZSM-5 | 360 | ~0.5 | >380 |
| CP811C-300 | Zeolyst | beta | 300 | 0.56-0.67 | 620 |
| CBV28014 | Zeolyst | ZSM-5 | 280 | 0.53-0.59 | 400 |
| Beta-zeolite | ACS materials | beta | 150 | 0.55-0.70 | ~500 |
| ZSM-5 P-25 | ACS materials | ZSM-5 | 25 | ~0.5 | >=340 |
| HiSiv1000 | UOP | y-zeolite | >20 | 0.8 | >550 |
| ZSM-35 | ACS materials | ferrierite | 15 | 0.5-0.6 | ~300 |
| Ti-Silicalite-1 (Type B) | ACS materials | — | >25 | ~0.5 | 360-420 |

The 9 molecular sieves were tested in batch uptake experiments with hopped wort at a phase ratio of 100 grams wort per gram of dry weight of molecular sieve.

Aldehydes were analysed by headspace solid-phase micro-extraction (HS-SPME) using a method adapted from Vesely et al. (*Analysis of Aldehydes in Beer Using Solid-Phase Microextraction with On-Fiber Derivatization and Gas Chromatography/Mass Spectrometry*, Journal of Agricultural and Food Chemistry, (2003); 51(24), 6941-6944.), in a GC-MS (Agilent 7890A and 5975C MSD) and a 30 m×0.25 mm×0.25 µm VF17MS column. The derivatization reaction was carried out with O-(2,3,4,5,6-pentafluorobenzyl)-hydroxylamine (PFBOA). Helium was used as the carrier gas at a flow rate of 1 mL/min.

The results are depicted in Table 2.

TABLE 2

| Name | Reduction $c_e/c_i$ [%] | | | Iso-alpha acids % adsorption |
|---|---|---|---|---|
| | 2-MB | 3-MB | Methional | |
| HiSiv3000 | 99.1 | 98.8 | 97.9 | 1.9 |
| ZSM-5 P-360 | 97.4 | 97.1 | 90.5 | 1.8 |
| CP811C-300 | 97.8 | 96.9 | 86.3 | 4.5 |
| CBV28014 | 98.3 | 98.3 | 95.9 | 0 |
| Beta-zeolite | 97.3 | 97.0 | 90.9 | 20.4 |
| ZSM-5 P-25 | 59.5 | 32.4 | 85.5 | 0 |
| HiSiv1000 | 66.7 | 63.8 | 39.7 | 61.4 |
| ZSM-35 | 41.7 | 24.0 | 65.7 | 1.1 |
| Ti-Silicalite-1 (Type B) | 97.2 | 96.7 | 99.2 | 7.2 |

Example 2

Three commercially available alcohol-free beers (beers A to C) were treated with hydrophobic silicate-based molecular sieves (zeolite CBV28014 from Zeolyst International and zeolite ZSM-5 P-360 from ACS Materials) in accordance with the present invention, using 1 gram of zeolite per 100 grams of beer.

Table 3a-3c shows the concentrations of Strecker aldehydes and maltotriose in each of the tested beers before and after treatment (CB1=zeolite CBV28014, ZS1=zeolite ZSM-5 P-360).

TABLE 3a

| BEER A | Before treatment | After treatment | |
|---|---|---|---|
| | | CB1 | ZS1 |
| [methional] in µg/L | 13.8 | 1.8 | 1.8 |
| [2-methyl butanal] in µg/L | 8.7 | 0.5 | 0.4 |
| [3-methyl butanal] in µg/L | 18.5 | 1.2 | 1.4 |
| [2-methyl propanal] in µg/L | 9.3 | 1.3 | 1.3 |
| [phenyl acetealdehyde] in µg/L | 43.5 | 6.0 | 3.9 |
| [furfural] in µg/L | 382.2 | 31.3 | 14.0 |
| [iso-alpha acids] in mg/L | 18.4 | 18.4 | 18.3 |
| [maltotriose] in g/L | 9.4 | 9.3 | 9.4 |
| $X = \frac{([Meth])}{9} + \frac{([2MB])}{5} + \frac{([3MB])}{14} + \frac{([2MP])}{8} + \frac{([PA])}{9} + \frac{([FF])}{100}$ | 14.4 | 1.5 | 1.1 |
| X/[maltotriose] | 1.53 | 0.16 | 0.12 |

TABLE 3b

| BEER B | Before treatment | After treatment | |
|---|---|---|---|
| | | CB1 | ZS1 |
| [methional] in µg/L | 2.9 | 0.7 | 0.6 |
| [2-methyl butanal] in µg/L | 1.5 | 0.2 | 0.1 |
| [3-methyl butanal] in µg/L | 5.8 | 0.3 | 0.3 |
| [2-methyl propanal] in µg/L | 2.2 | 0.4 | 0.7 |
| [phenyl acetealdehyde] in µg/L | 15.7 | 3.2 | 2.5 |
| [furfural] in µg/L | 111.9 | 12.8 | 6.7 |
| [maltotriose] in g/L | 8.5[1] | 8.5 | 8.5 |
| $X = \frac{([Meth])}{9} + \frac{([2MB])}{5} + \frac{([3MB])}{14} + \frac{([2MP])}{8} + \frac{([PA])}{9} + \frac{([FF])}{100}$ | 4.2 | 0.7 | 0.5 |
| X/[maltotriose] | 0.49 | 0.08 | 0.06 |

[1] Estimated value - assuming that maltotriose content is not affected by treatment

TABLE 3c

| BEER C | Before treatment | After treatment | |
|---|---|---|---|
| | | CB1 | ZS1 |
| [methional] in µg/L | 1.4 | 0.6 | 0.7 |
| [2-methyl butanal] in µg/L | 3.2 | 0.1 | 0.1 |
| [3-methyl butanal] in µg/L | 3.5 | 0.9 | 1.0 |
| [2-methyl propanal] in µg/L | 2.4 | 0.3 | 0.6 |
| [phenyl acetealdehyde] in µg/L | 11.3 | 3.9 | 3.5 |

TABLE 3c-continued

| BEER C | Before treatment | After treatment | |
| --- | --- | --- | --- |
|  |  | CB1 | ZS1 |
| [furfural] in µg/L | 139.4 | 10.1 | 6.0 |
| [maltotriose] in g/L | 6.5 | 6.5 | 6.5 |
| $X = \frac{([Meth])}{9} + \frac{([2MB])}{5} + \frac{([3MB])}{14} + \frac{([2MP])}{8} + \frac{([PA])}{9} + \frac{([FF])}{100}$ | 4.0 | 0.7 | 0.7 |
| X/[maltotriose] | 0.62 | 0.11 | 0.11 |

Example 3

Another alcohol-free lager beer was produced by means of a Cold Contact Process. This beer was treated by passing the beer over a column filled with the granular zeolite ZSM-5 G-360 from ACS Materials. The particles were crushed and sieved to select particles with a diameter between 50-500 µm. A column having an internal diameter of 1 cm and a length of 2.7 cm was filled with a sludge of screened particles (1.524 g of dry zeolite) by flow packing and stored in 20 vol. % ethanol. Next, it was connected to an Akta explorer 10 (GE Healthcare) system and conditioned with milliQ water until the UV signal was stable. The sterile-filtered beer was then passed through the column at a flow rate of 2 mL/min and fractions of 10 mL were collected with an automatic fraction collector system and frozen immediately. The process was performed under constant room temperature and a maximum pressure drop of 40 bars. The first three collected fractions were discarded, Fractions 4 (30-40 mL) and 5 (40-50 mL) were combined and a sample was taken for analysis.

Table 4 shows the concentrations of Strecker aldehydes and maltotriose before and after treatment.

TABLE 4

|  | Before treatment [1] | After treatment |
| --- | --- | --- |
| [methional] in µg/L | 25.4 | 1.9 |
| [2-methyl butanal] in µg/L | 8.2 | 0.5 |
| [3-methyl butanal] in µg/L | 37.8 | 2.6 |
| [2-methyl propanal] in µg/L | 20.0 | 1.2 |
| [phenyl acetealdehyde] in µg/L | 61.9 | 6.4 |
| [furfural] in µg/L | 250 | 5.5 |
| [maltotriose] in g/L | 13.6 |  |
| $X = \frac{([Meth])}{9} + \frac{([2MB])}{5} + \frac{([3MB])}{14} + \frac{([2MP])}{8} + \frac{([PA])}{9} + \frac{([FF])}{100}$ | 19.0 | 1.4 |
| X/[maltotriose] | 1.40 | 0.10 [2] |

[1] Sample taken from beer that had been passed through a bypass of the Äkta system; thus excluding effects caused by interaction with the tube system
[2] Estimated value - assuming that maltotriose content is not affected by treatment

The invention claimed is:

1. A non-alcoholic fermented beer having an alcohol content of less than 1.0% ABV, and comprising methional, 2-methyl butanal, 3-methyl butanal, 2-methyl propanal, phenyl acetaldehyde and furfural and maltotriose in concentrations that meet the following conditions:

$$X = \frac{([Meth])}{9} + \frac{([2MB])}{5} +$$

$$\frac{([3MB])}{14} + \frac{([2MP])}{8} + \frac{([PA])}{9} + \frac{([FF])}{100} \quad \frac{X}{[Maltotriose]} \leq 0.4$$

wherein

[Meth] represents the methional concentration in µg/L;
[2 MB] represents the 2-methyl butanal concentration in µg/L;
[3 MB] represents the 3-methyl butanal concentration in µg/L;
[2MP] represents the 2-methyl propanal concentration in µg/L;
[PA] represents the phenyl acetaldehyde concentration in µg/L;
[FF] represents the furfural concentration in µg/L;
[Maltotriose] represents the maltotriose concentration in g/L.

2. The non-alcoholic beer according to claim 1, wherein the beer contains methional, 2-methyl butanal, 3-methyl butanal, 2-methyl propanal, phenyl acetaldehyde and furfural in concentrations that meet the following condition:

$$\frac{([Meth])}{9} + \frac{([2MB])}{5} + \frac{([3MB])}{14} + \frac{([2MP])}{8} + \frac{([PA])}{9} + \frac{([FF])}{100} \leq 6.0.$$

3. The non-alcoholic beer according to claim 1, comprising at least 6 g/L maltotriose.

4. The non-alcoholic beer according to claim 3, comprising at least 8 g/L maltotriose.

5. The non-alcoholic beer according to claim 1, comprising methional in a concentration of less than 20 µg/L and/or 2-methyl butanal in a concentration of less than 8 µg/L and/or 3-methyl butanal in a concentration of less than 25

µg/L and/or 2-methyl propanal in a concentration of less than 15 µg/L and/or phenyl acetaldehyde in a concentration of less than 20 µg/L.

6. The non-alcoholic beer according to claim 1, comprising methional and methionine in a weight ratio of less than 0.8 (µg/mg).

7. The non-alcoholic beer according to claim 1, comprising less than 100 µg/L furfural.

8. The non-alcoholic beer according to claim 1, comprising at least 1.0 mg/L iso-alpha acids selected from the group consisting of isohumulone, isoadhumulone, isocohumulone and combinations thereof.

9. The non-alcoholic beer according to claim 1, wherein the beer is a lager.

10. A non-alcoholic fermented beer having an alcohol content of less than 1.0% ABV, and comprising methional, 2-methyl butanal, 3-methyl butanal, 2-methyl propanal, phenyl acetaldehyde and furfural and maltotriose in concentrations that meet the following conditions:

$$X = \frac{([Meth])}{9} + \frac{([2MB])}{5} +$$

-continued $$\frac{([3MB])}{14} + \frac{([2MP])}{8} + \frac{([PA])}{9} + \frac{([FF])}{100} \frac{X}{[Maltotriose]} \leq 0.4$$

wherein

[Meth] represents the methional concentration in µg/L;

[2 MB] represents the 2-methyl butanal concentration in µg/L;

[3 MB] represents the 3-methyl butanal concentration in µg/L;

[2MP] represents the 2-methyl propanal concentration in µg/L;

[PA] represents the phenyl acetaldehyde concentration in µg/L;

[FF] represents the furfural concentration in µg/L;

[Maltotriose] represents the maltotriose concentration in g/L, wherein the non-alcoholic beer comprises at least 8 g/L maltotriose.

* * * * *